Sept. 28, 1943. C. F. OSGOOD Re. 22,382
ROCK DRILL
Original Filed May 7, 1941 2 Sheets-Sheet 1
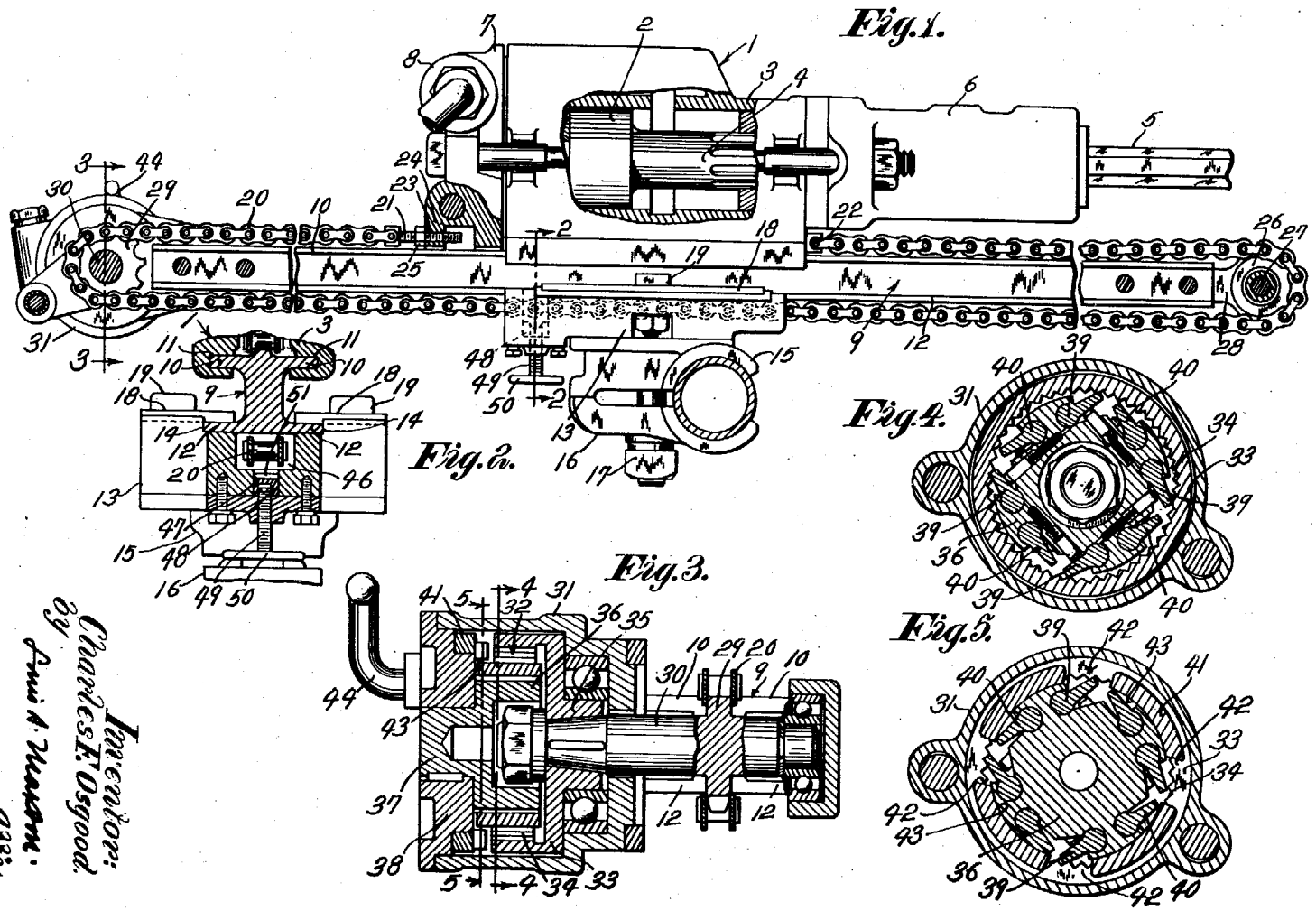
Inventor:
Charles F. Osgood.
By
Louis A. Mason.
Atty.

Sept. 28, 1943. C. F. OSGOOD Re. 22,382

ROCK DRILL

Original Filed May 7, 1941 2 Sheets-Sheet 2

Inventor:
Charles F. Osgood
by
Louis A. Maxson
Att'y.

Reissued Sept. 28, 1943

Re. 22,382

UNITED STATES PATENT OFFICE 22,382

ROCK DRILL

Charles F. Osgood, Claremont, N. H., assignor to Sullivan Machinery Company, a corporation of Massachusetts Original No. 2,309,077, dated January 19, 1943, Serial No. 392,317, May 7, 1941. Application for reissue August 4, 1943, Serial No. 497,405

17 Claims. (Cl. 255—45)

This invention relates to rock drills, and more particularly, but not exclusively, to improvements in supporting, guiding and feeding means for a hammer rock drill of the mounted drifter type.

An object of this invention is to provide an improved rock drill supporting, guiding and feeding means whereby the drill hammer motor may be supported, guided and fed in an improved manner. Another object is to provide an improved adjustable supporting and guiding means for a drill hammer motor whereby with an extremely compact structure, a relatively long range of feed may be obtained. A further object is to provide an improved drill guide adjusting means and drill feeding means wherein elements of the guide adjusting means cooperate with elements of the drill feeding means in an improved manner. A still further object is to provide an improved drill feeding and guide adjusting means operated by a vibratory action set up within the drall hammer motor incident to the operation of the latter. Yet another object is to provide improved motor operated mechanism embodying selectively operable means operable at will alternately for adjusting the hammer motor guide relative to its support and for feeding the hammer motor along said guide. A still further object is to provide an improved drill supporting, guiding and feeding means which embodies a guide on which the drill hammer motor is guided, and has improved motor operated means for feeding the hammer motor relative to the guide and for adjusting the guide relative to its support, and embodying means for locking an element of the feeding means relative to the guide support during guide adjustment Still another object is to provide an improved means for feeding the member to be fed and for adjusting the guide embodying a motor movable with the member to be fed relative to the guide during the feeding operation. These and other objects and advantages of the invention will, however, hereinafter more fully appear as the description proceeds.

This application is a continuation-in-part of my copending application, Ser. No. 206,410, filed May 6, 1938, now matured into Patent No. 2,268,573.

In the accompanying drawings there are shown for purposes of illustration two forms which the invention may assume in practice.

In these drawings:

Fig. 1 is a central longitudinally extending, vertical sectional view, with parts shown in elevation, of a rock drill constructed in accordance with one illustrative embodiment of the invention.

Fig. 2 is an enlarged detail vertical sectional view taken on line 2—2 of Fig. 1.

Fig. 3 is an enlarged cross sectional view taken on line 3—3 of Fig. 1.

Fig. 4 is a detail cross sectional view taken on line 4—4 of Fig. 3.

Fig. 5 is a detail cross sectional view taken on line 5—5 of Fig. 3.

Figure 6:
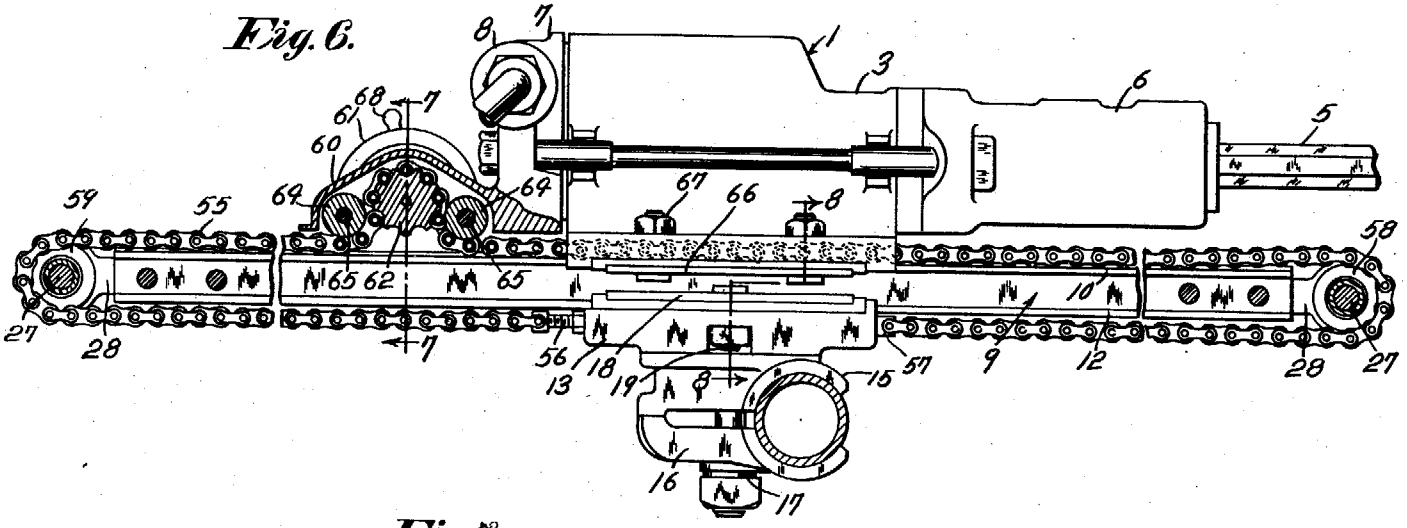
Fig. 6 is a view similar to Fig. 1, showing another illustrative embodiment of the invention.

In both illustrative embodiments of the invention the improved supporting, guiding and feeding means is shown associated with a drill hammer motor, generally designated 1, herein of a conventional design, comprising a pressure-fluid-actuated hammer piston 2 reciprocably mounted in a motor cylinder 3. The hammer piston has a striking bar 4 adapted to deliver impact blows to the shank of a drill steel 5 suitably supported within a front chuck housing 6 secured to the front end of the motor cylinder. The rear end of the motor cylinder has secured thereto a rear head block 7 having arranged thereon a conventional throttle valve mechanism 8 for controlling the supply of motive fluid to the motor cylinder for effecting reciprocation of the hammer piston. As the construction and mode of operation of a drill hammer motor of the type disclosed are well known to those skilled in the art, further description thereof is herein unnecessary.

In the illustrative embodiment of the invention shown in Figs. 1 to 5, inclusive, a drill guide frame is generally designated 9 and is herein preferably in the form of an I-beam having lateral top flanges 10, 10 providing longitudinal guides along which the drill hammer motor 1 is slidably guided, the hammer motor preferably having longitudinal guideways 11, 11 formed integral with the motor cylinder 3 and slidably engaging the guides 10. Engaging the bottom lateral flanges 12, 12 of the guide frame is a trunnion support 13 having guideways 14 receiving the I-beam flanges 12 and provided with a bottom clamp 15, the latter adapted to be suitably adjusted by a clamp member 16 and cooperating clamping bolt 17 to a column or bar, in a well known manner. The bolt 17 serves to tighten the clamp parts to secure the trunnion support to the column or bar. The top plates 18 of the guideways 14 are adapted to be tightened by bolts 19 for clamping the guide frame to the bottom trunnion support. Manifestly, when the clamping bolts 19 are loosened, the guide frame 9 may be slid longitudinally within the guideways on the trunnion support relative to the latter into any desired guiding position and thereafter firmly clamped in its adjusted position.

The feeding means operated by a vibratory action set up within the drill hammer motor incident to the operation of the latter, in this illustrative construction, includes a circulatory control chain 20 having its top and bottom run portions respectively overlying and underlying the guide frame 9, and the control chain is arranged in vertical planes extending longitudinally of the I-beam midway between the sides of the latter, in a manner shown in Fig. 2, and has its ends fastened at 21 and 22 respectively to the rear head block and the motor cylinder of the drill hammer motor. The connection of the chain at 21 to the hammer motor is preferably adjustable to permit tightening of the chain, and comprises a screw 23 received within a threaded opening in a lug 24 integral with the rear head block and provided with a lock nut 25. The connection at 22 is permanent and non-adjustable. The control chain 20 is guided at the forward end of the guide frame by a vertical guide roll 26 journaled on a bearing sleeve supported by a transverse bolt 27 secured to a bracket 28, herein attached by bolts to the forward end of the I-beam, and is guided at the rear end of the guide frame by a vertical chain sprocket 29 formed on a horizontal shaft 30 suitably journaled in a casing 31 secured to the I-beam. Arranged in the casing 31 is a feed control means, generally designated 32, for controlling rotation of the chain sprocket 29. The control means 32 comprises a rotatable ratchet ring 33 provided with internal ratchet teeth 34 and having its hub 35 keyed to the shaft 30 (Fig. 3). Arranged concentrically within the ratchet ring is a non-rotatable pawl carrier 36 having a stub shaft 37 keyed to a detachable cover plate 38 of the casing 31. This pawl carrier carries reversible, spring-pressed pawls 39 and 40 (Figs. 4 and 5) engageable with the ratchet teeth for controlling the direction of rotation of the chain sprocket 29 and for at times locking the chain sprocket against rotation. The pawls are herein preferably eight in number, four for controlling rotation of the sprocket in one direction and four for controlling rotation of the sprocket in the opposite direction. For selectively rendering the sets of pawls effective, a shifter annulus 41 is rotatably mounted within the casing 31 on a circular projection integral with the cover plate 38, and this annulus is cut-away to provide recesses or slots 42 (Fig. 5) for permitting the pawls to move into engagement with the ratchet teeth, and the internal peripheral surface 43 of the annulus is engageable with the pawls for pressing the latter inwardly into their released position. The shifter annulus is movable into an intermediate position wherein the recesses 42 permit both sets of pawls to move into engagement with the ratchet teeth, thereby to lock the ratchet ring, and consequently the chain sprocket 29, against rotation. For moving the shifter annulus into its different positions, a lever 44 is operatively connected to the shifter annulus. The chain sprocket 29, as shown most clearly in Fig. 1, engages the control chain 20, and the chain is adapted to circulate relative to the sprocket. The trunnion support 15 has a longitudinal passage 46 extending therethrough beneath the bottom of the guide frame 9 (see Fig. 2), and the bottom run portion of the control chain 20 extends along the bottom of the I-beam through the passage 46. Mounted in a guiding recess 47 in the trunnion support is a reciprocable chain lock 48 having an operating screw 49 provided with an operating handle 50. This chain lock has projecting teeth 51 adapted to interlock with links of the control chain 20 to lock the latter against movement relative to the trunnion support. As the control means 32 is fully described in the copending application above referred to, further description thereof is unnecessary herein.

The mode of operation of the embodiment of the invention above described is as follows: The guide frame 9 may be set up at the working face by clamping the trunnion support 15 by the trunnion clamp 16 on a bar or column, and the guide frame is suitably clamped in position by the clamping plates 18 adjusted by the bolts 19. When the guide frame is in the desired location and the chain lock 48 is released, the operator may manipulate the control handle 44 of the shifter annulus 41 to move the latter into a position wherein the reverse-feed-effecting pawls 39 are (as shown in Figs. 4 and 5) in engagement with the ratchet teeth of the ratchet ring 33 so that the control sprocket is free to rotate in a counterclockwise direction, as viewed in Fig. 1, to permit movement of the hammer motor rearwardly along the guide frame and slide the hammer motor manually to its rearward position. When the hammer motor is in its rearmost position on the guide frame, the operator may reverse the position of the shifter annulus 41 to render active the forward-feed-effecting pawls 40, and may then manipulate the throttle valve mechanism 8 to effect the supply of motive fluid to the drill hammer motor to effect operation of the latter, thereby to actuate percussively the drill steel 5. When the drill hammer motor is running, and the drill steel is percussively actuated, the reciprocatory movement of the hammer piston causes, due to the sudden reversals in the directions of movement of the piston, vibratory or recoil movements of the hammer motor alternately in opposite directions longitudinally thereof, resulting in alternating tendencies of movement of the hammer motor forwardly and rearwardly with respect to the guide frame in the manner well understood by those skilled in the art. Movement of the hammer motor in the rearward direction is checked automatically by the ratchet and pawl mechanism, the then active pawls 40 engaging the ratchet teeth automatically checking reverse rotation of the chain sprocket 29 while permitting the chain sprocket to rotate freely in a forward-feed-effecting direction. When the shifter annulus 41 is in a position opposite that shown in Fig. 5, the control sprocket 29 will be free to rotate in a clockwise direction as viewed in Fig. 1. The vibrations set up within the hammer motor incident to the operation thereof will then effect, through the control chain 20, rotation of the control sprocket, and as a result the hammer motor will be fed step by step along the guide frame in a forward-feeding direction. Reverse rotation of the control sprocket 29 is checked automatically by the pawls 40 engaging the teeth of the ratchet ring, thereby to prevent rotation of the control sprocket in a counter-clockwise direction as viewed in Fig. 1. It will thus be seen that as the hammer piston of the hammer motor reciprocates within the motor cylinder, with the shifter annulus in the position opposite that of Fig. 5, the control sprocket is free to rotate in a forward-feed-effecting direction due to the jars set up by the hammer piston, the active pawls releasing automatically to permit free rotation of the control sprocket in the forward-feed-effecting direction and to check automatically rotation of the control sprocket in the reverse direction.

The guide frame 9 may also be adjusted relative to the trunnion support by the same vibratory action of the hammer motor as that which effects hammer motor feed, simply by releasing the clamping plates 18 for the guide frame and connecting the chain lock 48 to hold the control chain 20 stationary relative to the trunnion support 13. The vibrations set up within the hammer motor incident to the operation thereof then effect, through the control chain 20, rotation of the control sprocket in the desired direction, the shifter annulus 41 having been appropriately positioned; and as a result the guide frame is automatically fed in the desired direction relative to the trunnion support. When the guide frame is in the desired adjusted position with respect to the trunnion support, the operator may clamp the same in adjusted position by tightening the bolts 19 of the clamping plates 18. The guide frame is stationary with respect to the trunnion support during normal feeding of the hammer motor along the guide frame. It is accordingly evident that under the control of the shifter annulus of the control means, the hammer motor and guide frame may be fed at the operator's will in either of opposite directions relative to the trunnion support.

Figure 8:
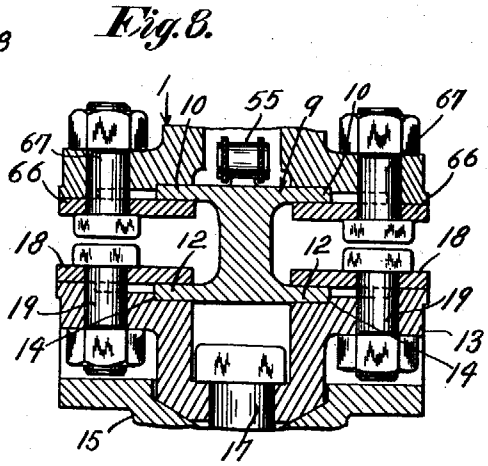
Fig. 8 is an enlarged vertical sectional view taken substantially on line 8—8 of Fig. 6.
Figure 7:
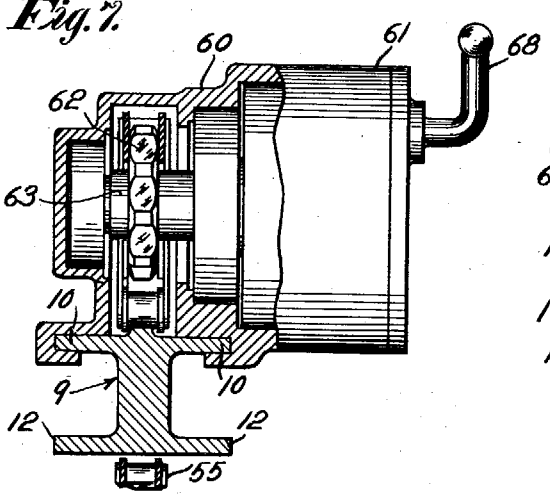
Fig. 7 is an enlarged cross sectional view taken on line 7—7 of Fig. 6, with parts shown in elevation.

In the modification of the invention shown in Figs. 6 to 8 inclusive, instead of utilizing the vibratory action of the hammer motor, an independent motor is provided for effecting hammer motor feed and guide adjustment. In this modified construction the hammer motor, the adjustable guide and trunnion support are similar to those above described. A feed chain 55 has its top and bottom run portions respectively overlying and underlying the guide frame 9, and, as in the form of the invention above described, the chain is arranged in vertical planes extending longitudinally of the I-beam midway between the sides of the latter in the manner shown in Fig. 8. The ends of the feed chain are fastened at 56 and 57 respectively to the opposite ends of the trunnion support 13, as shown in Fig. 6, and the connection at 56 is adjustable to permit tightening of the control chain, while the connection at 57 is permanent. The feed chain is guided at the forward end of the guide frame by a vertical guide roll 58 journaled on the bearing sleeve supported by the transverse bolt 27 secured to the bracket 28 attached to the forward end of the I-beam, and is guided at the rear end of the guide frame by a vertical guide roll 59 journaled on a similar bracket attached to the rear end of the I-beam. Herein, preferably formed integral with the rear head block 7 of the hammer motor, is a casing 60 on which is mounted an independent motor 61. This motor is of a conventional pressure-fluid-actuated type and has a chain sprocket 62 fixed to its power shaft 63. The chain sprocket 62, as shown most clearly in Fig. 6, engages the feed chain 55, and guide rolls 64, journaled on parallel horizontal shafts 65 supported by the casing 60, guide the chain through the open bottom of the casing and relative to the chain sprocket. A clamp 66, adjusted by a bolt 67, is mounted on the drill hammer motor, as shown in Figs. 6 and 8, and this clamp is adjustable to lock the hammer motor against longitudinal movement relative to the guide frame. The motor 61 is of a conventional reversible type and is provided with a reversing valve mechanism having an operating handle 68.

The mode of operation of this embodiment of the invention is relatively similar to that above described, with the primary exception that, in this instance, the jars set up within the hammer motor are not employed to effect feed of the hammer motor and adjustment of the guide. In this construction, when the parts are in the position shown in Fig. 6, and the guide frame 9 is held against longitudinal adjustment relative to the trunnion support 13 by the clamp 18, and the clamp 66 for the hammer motor is released, the motor 61 may be operated to effect rotation of the feed sprocket 62 relative to the then stationary feed chain 55, thereby to effect feed of the drill hammer motor in either of opposite directions along the guide frame. When the hammer motor clamp 66 is applied to hold the hammer motor against movement relative to the guide frame and the guide frame clamp 18 is released, the motor 61 may be operated to effect rotation of the feed sprocket 62, thereby to actuate the feed chain 55 to effect adjustment of the guide frame along its guideways relative to the trunnion support. Otherwise this embodiment of the invention is similar to that above described.

As a result of this invention, it will be noted that an improved rock drill supporting, guiding and feeding means is provided whereby the drill hammer motor may be supported, guided and fed in an improved manner. It will further be noted that by the provision of the adjustable supporting and guiding means for the drill hammer motor a relatively long range of feed is obtained while a relatively compact supporting and guiding structure is retained. It will further be noted that by the provision of the drill feeding means operated by the motor which moves along the guide with the member to be fed, the member to be fed may not only be fed automatically along its guide, but also the guide may be adjusted automatically into different drill guiding positions. Other uses and advantages of the invention will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In combination, a support, a guide mounted on said support for adjustment in a longitudinal direction relative thereto, a member to be fed guided on said guide for feeding movement longitudinally therealong, and motor operated mechanism mounted on said guide for longitudinal movement therewith and including selectively operable means operable at will alternatively for adjusting said guide relative to said support and for feeding said member to be fed along said guide, said means including a motor rotated element common to and turning during both member-feed and guide-adjustment.

2. In combination, a support, a guide mounted on said support for adjustment in a longitudinal direction relative thereto, a member to be fed guided on said guide for feeding movement longitudinally therealong, motor operated mechanism mounted on said guide for longitudinal movement therewith and including selectively operable means operable at will for adjusting said guide relative to said support and for feeding said member to be fed along said guide, said means including a motor rotated element common to and turning during both member-feed and guide-adjustment and said mechanism including means for holding said guide against movement with respect to said support to effect feeding of said member to be fed along said guide by said mechanism.

3. In combination, a support, a guide mounted on said support for adjustment in a longitudinal direction relative thereto, a member to be fed guided on said guide for feeding movement therealong, and motor operated mechanism for adjusing said guide relative to said support and for feeding said member to be fed along said guide, said mechanism including a motor rotated element common to and turning during both member-feed and guide-adjustment and releasable locking means for holding said guide stationary with respect to said support to effect feeding of said member to be fed by said mechanism.

4. In combination, a support, a guide mounted on said support for adjustment in a longitudinal direction relative thereto, a member to be fed guided on said guide for feeding movement therealong, and motor operated mechanism for adjusting said guide relative to said support and for feeding said member to be fed along said guide, said mechanism including releasable locking means for holding said guide stationary with respect to said support to effect feeding of said member to be fed by said mechanism and for holding said member to be fed against movement with respect to said guide to effect adjustment of the latter by said mechanism.

5. In combination, a support, a guide mounted on said support for adjustment in a longitudinal direction relative thereto, a hammer motor guided on said guide for feeding movement longitudinally therealong, a motor mounted on said guide for movement longitudinally relative thereto with said hammer motor, and mechanism operated by said second mentioned motor alternatively for adjusting said guide relative to said support and for feeding said hammer motor along said guide.

6. In combination, a support, a guide mounted on said support for adjustment in a longitudinal direction relative thereto, a hammer motor guided on said guide for feeding movement longitudinally therealong, a motor mounted on said guide for movement longitudinally relative thereto with said hammer motor, mechanism operated by said second mentioned motor for adjusting said guide relative to said support and for feeding said hammer motor along said guide, and a releasable lock for holding said guide stationary with respect to said support to effect feeding of said hammer motor along said guide by said mechanism.

7. In combination, a support, a guide mounted on said support for adjustment in a longitudinal direction relative thereto, a hammer motor guided on said guide for feeding movement longitudinally therealong, a motor mounted on said guide, and mechanism operated by said last mentioned motor for adjusting said guide relative to said support and for feeding said hammer motor along said guide, said mechanism including a releasable lock for holding said hammer motor stationary with respect to said guide to effect adjustment of the latter relative to said support by said mechanism.

8. In combination, a support providing a longitudinal guideway, a guide mounted on said support guideway for adjustment in a longitudinal direction relative thereto, a member to be fed guided on said guide for feeding movement longitudinally therealong, and motor operated mechanism mounted on said guide for adjusting the latter relative to said support and for feeding said member to be fed along said guide, said mechanism including a flexible element guided on said guide, a rotatable element cooperating with said flexible element, motor operated means for rotating said rotatable element, and means for locking said flexible element against movement with respect to said support to effect adjustment of said guide along said support guideway by said mechanism, said locking means being releasable to free said flexible element for movement with respect to said support during member-feed.

9. In combination, a support, a guide mounted on said support for adjustment in a longitudinal direction relative thereto, a member to be fed guided on said guide for feeding movement therealong, and motor operated mechanism for adjusting said guide relative to said support and for feeding said member to be fed along said guide, said mechanism including a flexible element operatively connected to said member to be fed and guided for circulation relative to said guide and said support, selectively operable means cooperating with said flexible element and operable at will for effecting selective operation of said guide-adjusting and member-feeding mechanism, and releasable means for locking said flexible element to said support to effect guide adjustment by said mechanism.

10. In combination, a support, a guide mounted on said support for adjustment in a longitudinal direction relative thereto, a member to be fed guided on said guide for feeding movement therealong, and motor operated mechanism for adjusting said guide relative to said support and for feeding said member to be fed along said guide, said mechanism including a flexible element operatively connected to said member to be fed and guided for circulation relative to said guide and said support, selectively operable means cooperating with said flexible element and operable at will for effecting selective operation of said guide-adjusting and member-feeding mechanism, and releasable means for locking said flexible element to said support to effect guide adjustment by said mechanism, said releasable means including a manually operable lock mounted on said support and adjustable relative to the support into locking engagement with said flexible element.

11. In combination, a support, a guide mounted on said support for adjustment in a longitudinal direction relative thereto, a member to be fed guided on said guide for feeding movement therealong, a motor mounted on said guide for movement longitudinally with said member to be fed relative to the guide, and mechanism operated by said motor for adjusting said guide relative to said support and for feeding said member to be fed along said guide, said mechanism including a flexible element operatively connected to said member to be fed and guided for circulation relative to said guide and said support, selectively operable means cooperating with said flexible element and operable at will for effecting selective operation of said guide-adjusting and member-feeding mechanism, and releasable means for locking said flexible element to said support to effect guide adjustment by said mechanism.

12. In combination, a support, a guide mounted on said support for adjustment in a longitudinal direction relative thereto, a member to be fed guided on said guide for feeding movement therealong, a motor mounted on said guide for movement longitudinally with said member to be fed relative to the guide, and mechanism operated by said motor for adjusting said guide relative to said support and for feeding said member to be fed along said guide, said mechanism including a flexible element operatively connected to said member to be fed and guided for circulation relative to said guide and said support, selectively operable means cooperating with said flexible element and operable at will for effecting selective operation of said guide-adjusting and member-feeding mechanism, and releasable means for locking said flexible element to said support to effect guide adjustment by said mechanism, said releasable means including a manually operable lock mounted on said support and adjustable relative to the support into locking engagement with said flexible element.

13. In a rock drill, the combination comprising a support, a guide mounted on said support for adjustment in a longitudinal direction relative thereto, a drilling implement to be fed guided on said guide for feeding movement longitudinally therealong, a motor mounted on said guide for movement longitudinally with said drilling implement relative thereto, and mechanism operated by said motor and including selectively operable means operable at will alternatively for adjusting said guide relative to said support and for feeding said drilling implement relative to said guide, said means including a motor rotated element common to and turning during both implement feed and guide-adjustment.

14. In a rock drill, the combination comprising a support, a guide mounted on said support for adjustment in a longitudinal direction relative thereto, a drilling implement to be fed guided on said guide for feeding movement longitudinally therealong, a motor mounted on said guide for movement longitudinally with said drilling implement relative thereto, mechanism operated by said motor and including selectively operable means operable at will for adjusting said guide relative to said support and for feeding said drilling implement relative to said guide, said means including a motor rotated element common to and turning during both implement feed and guide-adjustment, and means for holding said guide against movement with respect to said support to effect feeding of said drilling implement relative to said guide by said mechanism.

15. In a rock drill, the combination comprising a support, a guide mounted on said support for adjustment in a longitudinal direction relative thereto, a drilling implement to be fed guided on said guide for feeding movement longitudinally therealong, a motor mounted on said guide for movement longitudinally with said drilling implement relative thereto, mechanism operated by said motor and including selectively operable means operable at will for adjusting said guide relative to said support and for feeding said drilling implement relative to said guide, said feeding and guide adjusting mechanism including a flexible element guided for circulation relative to said guide and said support, and means for locking said flexible element to said support to effect adjustment of said guide relative to said support by said mechanism.

16. In a rock drill, the combination comprising a support, a guide mounted on said support for adjustment in a longitudinal direction relative thereto, a drilling implement to be fed guided on said guide for feeding movement longitudinally therealong, a motor mounted on said guide for movement longitudinally with said drilling implement relative thereto, mechanism operated by said motor and including selectively operable means operable at will for adjusting said guide relative to said support and for feedind said drilling implement relative to said guide, and means for holding said drilling implement against movement longitudinally with respect to said guide to effect adjustment of said guide relative to said support by said mechanism.

17. In combination, a support, a guide mounted on said support for adjustment in a longitudinal direction relative thereto, a member to be fed guided on said guide for feeding movement longitudinally therealong, and motor operated mechanism mounted on said guide for longitudinal movement therewith and including selectively operable means operable at will alternatively for adjusting said guide relative to said support and for feeding said member to be fed along said guide, said mechanism including a motor rotated element on said guide common to guide-adjustment and member-feed and turning during both of the same.

CHARLES F. OSGOOD.